United States Patent [19]

Sakagami et al.

[11] Patent Number: 4,571,390

[45] Date of Patent: Feb. 18, 1986

[54] SUBSTRATE CAPABLE OF ADSORBING PROTEIN

[75] Inventors: Teruo Sakagami; Masuhiro Shoji; Noriyuki Arakawa; Naohiro Murayama, all of Iwaki, Japan

[73] Assignee: Kureha Kagaku Kogyo Kabushiki Kaisha, Tokyo, Japan

[21] Appl. No.: 608,280

[22] Filed: May 8, 1984

Related U.S. Application Data

[63] Continuation-in-part of Ser. No. 456,847, Jan. 10, 1983, abandoned.

[30] Foreign Application Priority Data

Jan. 13, 1982 [JP] Japan .................................. 57-3940

[51] Int. Cl.$^4$ .............................................. B01J 20/26
[52] U.S. Cl. ........................................ 502/402; 502/9; 502/10
[58] Field of Search .............................. 502/402, 9, 10

[56] References Cited

U.S. PATENT DOCUMENTS

| | | | |
|---|---|---|---|
| 4,171,283 | 10/1979 | Nakashima et al. | 502/402 X |
| 4,174,430 | 11/1979 | Kido et al. | 521/146 |
| 4,220,726 | 9/1980 | Warshawsky | 502/402 X |
| 4,338,404 | 7/1982 | Tanaka et al. | 210/635 X |

FOREIGN PATENT DOCUMENTS

| | | |
|---|---|---|
| 3004356 | 8/1980 | Fed. Rep. of Germany . |
| 955354 | 6/1949 | France . |
| 45-40297 | 12/1970 | Japan . |
| 53-129275 | 11/1978 | Japan . |
| 849122 | 9/1960 | United Kingdom . |
| 885719 | 12/1961 | United Kingdom . |
| 885720 | 12/1961 | United Kingdom . |
| 1116800 | 6/1968 | United Kingdom . |
| 2042557A | 9/1980 | United Kingdom . |

OTHER PUBLICATIONS

Makromol. Chemie, 1966, vol. 98, pp. 42–57.
Z. Kunststoffe, 1960, vol. 50, pp. 375–380.
Beyèr, Lehrbuch der Org. Chemie, 11/12th edition, 1968, p. 440.
Ch. R. Harrison et al, Makromol. Chem., 1975, vol. 176, No. 2, pp. 267–274.
Journal of Polymer Science, Part A, vol. 2, pp. 835–843 (1964).

Primary Examiner—Patrick P. Garvin
Attorney, Agent, or Firm—Cushman, Darby & Cushman

[57] ABSTRACT

Disclosed herein are a porous substrate capable of adsorbing protein, having an exclusive molecular weight of at least 30,000, comprising a cross-linked copolymer having methylol groups, the copolymer being made of a monomer of styrenes and a cross-linking agent copolymerizable with the monomer, the outer surface of the porous substrate being hydrophilic and the pore surface thereof being hydrophobic, and a process for producing the same.

18 Claims, 1 Drawing Figure

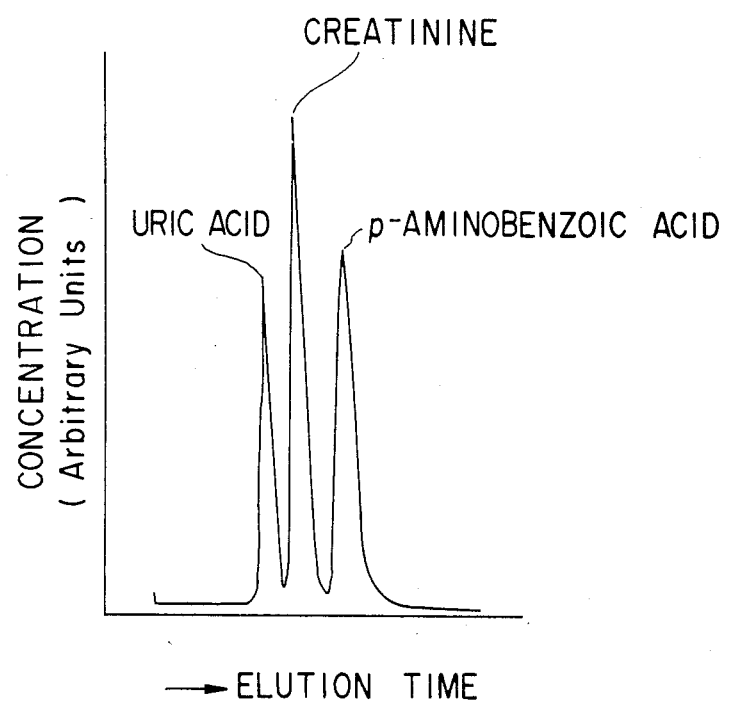

SUBSTRATE CAPABLE OF ADSORBING PROTEIN

CROSS-REFERENCE TO RELATED APPLICATION

The present application is a continuation-in-part of application Ser. No. 456,847 filed Jan. 10, 1983, and now abandoned.

SUMMARY OF THE INVENTION

In first aspect of the present invention, there is provided a porous substrate capable of adsorbing protein, having an exclusive molecular weight of at least 30,000, comprising a cross-linked copolymer having methylol groups, the copolymer being made of a monomer of styrenes and a cross-linking agent copolymerizable with the monomer, the outer surface of the porous substrate being hydrophilic and the pore surface thereof being hydrophobic.

In second aspect of the present invention, there is provided a porous substrate capable of adsorbing protein, having an exclusive molecular weight of at least 30,000 and having a hydrophilic outer surface and a hydrophobic pore surface thereof, which comprises a cross-linked copolymer having methylol groups, produced by subjecting a monomeric mixture of at least one monomer selected from styrene, alpha-methylstyrene and chloromethylstyrenes and a cross-linking agent copolymerizable with the monomer to suspension copolymerization in an aqueous solution of a water-soluble high polymeric substance in the presence of a pore-regulator, and introducing methylol groups into the resultant cross-linked copolymer.

In third aspect of the present invention, there is provided a process for preparing a porous substrate capable of adsorbing protein, comprising subjecting a mixture of a monomer of styrenes and a cross-linking agent copolymerizable with the monomer to suspension polymerization in an aqueous solution of a water-soluble high polymeric substance in the presence of a pore regulator, said pore regulator providing the porous substrate with an exclusive molecular weight of at least 30,000, and introducing methylol group into the resultant cross-linked polymer.

BACKGROUND OF THE INVENTION

The present invention relates to a porous substrate capable of adsorbing protein and a process for producing the porous substrate. More particularly, the present invention relates to a porous substrate capable of adsorbing protein, which comprises a cross-linked copolymer having methylol groups, produced by subjecting a monomeric mixture of at least one monomer selected from styrene, alpha-methylstyrene and chloromethylstyrenes and a cross-linking agent copolymerizable with the monomer to suspension copolymerization in an aqueous solution of a water-soluble high polymeric substance in the presence of a pore-regulator and introducing methylol groups into the resultant cross-linked copolymer. The outer surface of the substrate is hydrophilic due to the water-soluble high polymeric substance which has been present in the polymerization and attached to the outer surface of the substrate, and the surface of the pores in the substrate is hydrophobic or less hydrophilic than the outer surface of the substrate.

Recently, the importance of a substrate capable of specifically interacting with a substance in a living body has been increased. Namely, as a result of frequent utilization of the high-speed liquid chromatography as a means of analyzing such a substance, the development of a substrate which is to be used in the high-speed liquid chromatography and provided with an excellent specific interaction with such a substance has been demanded. Particularly, for obtaining various informations from the chromatograph of a substance in a living body, which is relatively easily available such as urine, serum, etc., the substrate for use in high-speed liquid chromatography of such a substance is regarded as important. In addition, in the case where such a substrate can be dispersed in the urine and serum and has an interactive function with a specified substance, the substrate can be applied to affinity chromatography, and further, such a substrate is can be applied to antigen-antibody reaction.

Hitherto, as a process for producing cross-linked polymer of styrene or a derivative of styrene, a process of copolymerising styrene and a cross-linking agent copolymerizable with styrene in a state of suspension in water in the presence of a pore-regulator has been known, and for instance, process for producing copolymer of styrene and divinylbenzene (as a cross-linking agent) has been precisely described in J. Polymer Sci., Part A-2, 835(1964). In the described process, wherein a water-soluble high polymeric substance is used as the major suspension stabilizer (suspending agent), although it is possible to produce fine particles of the cross-linked copolymer, an excessive amount of the water-soluble polymeric substance used in the polymerization in suspension adheres onto the surface of the fine particles of the cross-linked copolymer of styrene, and the thus adhered water-soluble high polymeric substance cannot be completely removed from the surface of the fine particles of the cross-linked copolymer even after repeated washing. In the case of applying the thus produced fine particles of the cross-linked copolymer as a substrate, for instance, in the gel-permeation chromatography (hereinafter referred to as GPC) combined with an organic solvent, the pressure necessary for carrying out the chromatography is larger than that in the ordinary case because of the viscous drag phenemenon occuring between the layer of the water-soluble high polymeric substance adhered onto the surface of the fine particles of the cross-linked copolymer and the fluid used in GPC, and together with the occurrence of a certain interaction of the water-soluble high polymeric substance with the component of the specimen to be analized, the phenomenon precluded the use of such a substrate in the liquid chromatography.

On the other hand, in cases where a phosphate such as calcium phosphate, magnesium phosphate, etc. is used as the suspension stabilizer (suspending agent) instead of the water-soluble high polymeric substance, the phosphate adhered to the surface of the fine particles of the cross-linked copolymer is easily removable by washing the particles with an acid, etc., and clean particles of the cross-linked copolymer of styrene can be obtained. However, because of the hydrophobic property of the surface of the thus obtained fine particles of the cross-linked copolymer, the particles cannot be dispersed in water, various aqueous buffer solutions, serum and urine, and cannot absorb proteins within the pores thereof and accordingly, the process cannot solve the problem of offering a substrate having the adsorbency toward protein which is the objective of the present invention.

As a result of studies of the present inventors, it has been found that by chemically introducing methylol groups into the dried porous microspherical particles of the cross-linked copolymer obtained by subjecting a monomeric mixture of at least one monomer selected from the group consisting of styrene, alpha-methylstyrene and chloromethylstyrenes and a cross-linking agent copolymerizable with the monomer to suspension copolymerization in an aqueous solution of a water-soluble high polymeric substance as a suspension stabilizer (suspending agent) in the presence of a pore-regulator, a substrate having its outer surface rich in hydrophilicity and the pores of which the surface is partly hydrophilic, however, richer in hydrophobicity than the outer surface is obtained, and that such a substrate is not only favorably dispersible in serum, urine, etc. but also is able to take proteins into the pores thereof and adsorb the thus taken protein therein, and the present invention has been accomplished based on these findings.

BRIEF EXPLANATION OF DRAWING

The FIGURE shows a chart recording elution peaks.

DETAILED DESCRIPTION OF THE INVENTION

It is an object of the present invention to provide a porous substrate having a facility of adsorbing protein.

Another object of the present invention is to provide a porous substrate of which the outer surface is highly hydrophilic and the surface of the pores of which is less hydrophilic than the outer surface, and the diameter of the pores of which is such that the proteins normally present in serum can enter into the pores.

Still another object of the present invention is to provide a process for producing the above-mentioned substrate.

The basic material of the porous substrate according to the present invention, namely, the porous fine particles made of cross-linked copolymer of a monomeric mixture of at least one monomer selected from the group consisting of styrene, alpha-methylstyrene and chloromethylstyrenes and a cross-linking agent copolymerizable with the monomer is obtained by subjecting the monomeric mixture to suspension copolymerization in an aqueous solution of a water-soluble polymeric substance in the presence of a radical-type initiator and a pore-regulator.

As the cross-linking agent copolymerizable with at least one monomer selected from the group consisting of styrene, alpha-methylstyrene and chloromethylstyrenes, the following compounds may be mentioned for example, divinylbenzene, trivinylbenzene, triallyl isocyanurate, dimethacrylate of a polyhydric alcohol, diacrylate of a polyhydric alcohol and diallyl phthalate, and divinylbenzene is most preferable because of the easiness of the introduction of methylol groups into the thus obtained cross-linked copolymer. It is preferable to use the cross-linking agent in an amount of 30 to 70% by weight of total amount of the monomeric mixture of at least one monomer and the cross-linking agent.

The most preferable cross-linked copolymer for the object of the present invention is that of styrene and divinylbenzene.

As the radical-type initiator in the present invention, an initiator used in the conventional radical polymerization of a vinyl monomer in a state of aqueous suspension may be used, for instance, an organic peroxide such as benzoyl peroxide and butyl perbenzoate, an azo-compound such as azobisisobutyronitrile and the like. Benzoyl peroxide is preferably used in the present invention because of the relatively easy grafting of the water-soluble high polymeric substance to the cross-linked copolymer by the action of benzoyl peroxide.

As the water-soluble high polymeric substance, those water-soluble high polymeric substances in general, such as polyethylene oxide, polyvinyl alcohol, saponified products of polyvinyl acetate, polyvinylpyrrolidone, methylcellulose, etc. may be mentioned. In particular, according to the present invention, for the purpose of coating the outer surface of the cross-linked copolymer with good hydrophilicity, 5 to 60 parts, preferably 10 to 40 parts by weight of the water-soluble high polymeric substance is used per 100 parts by weight of the total amount of the monomeric mixture. In the case of using below 5 parts by weight, it is insufficient to coat the outer surface of the cross-linked copolymer with hydrophilicity, and on the other hand, in the case of using over 60 parts by weight, the viscosity of the system of polymerization becomes too large and accordingly, not only it is impossible to obtain complete microspherical particles of the cross-linked copolymer but also too much amount of the water-soluble high polymeric substance adheres on the outer surface of the cross-linked copolymer and gives unfavorable effects on the introduction of methylol groups.

In addition to the water-soluble high polymeric substance, an extremely small amount of a phosphate such as hydroxyapatite as a suspension stabilizer or an anionic surfactant may be added to the system of copolymerization. The control of the diameter of the fine particles of the cross-linked copolymer according to the present invention is possibly carried out by adjusting the amount of the water-soluble high polymeric substance, the weight ratio of the monomeric mixture to water and the stirring power applied to the system, and in the case of using the surfactant, by adjusting the amount thereof. In the present invention, the cross-linked copolymer preferably consists of fine spherical particles of ordinarily 1 to 300$\mu$ in diameter.

The pore-regulator is used for adjusting the diameter of the opening of the pores (hereinafter referred to as pore size) formed on the outer surface of the microspherical particles of the cross-linked copolymer. Any organic solvent may be used as the pore regulator so far as it is soluble in the monomeric mixture. For instance, an aromatic hydrocarbon such as benzene, toluene, xylene and the like, a chlorohydrocarbon such as trichloroethylene, chloroform, carbon tetrachloride and the like and an aliphatic hydrocarbon such as n-hexane, n-heptane, n-octane, n-dodecane and the like, and the mixture thereof may be used as the pore-regulator.

Although the pore size of the microspherical particles of the cross-linked copolymer can be easily regulated by the kinds and/or the amount of the pore-regulator, ordinarily, it is preferable to use 20 to 300 parts by weight of the pore-regulator per 100 parts by weight of the total amount of the monomeric mixture, i.e., a mixture of at least one selected from the group consisting of styrene, alpha-methylstyrene and chloromethylstyrenes and a cross-linking agent copolymerizable with at least one selected from the group consisting of styrene, alpha-methylstyrene and chloromethylstyrenes. The pore size of the microspherical particles of the cross-linked copolymer is very important, because the pore size does not show any substantial change after methylol groups have been introduced into the cross-linked copolymer for converting thereof into the porous substrate according to the present invention, and the protein to be adsorbed to the porous substrate enters into the porous substrate from the opening of the pore and is adsorbed onto the surface of the pores. The pore size of the porous substrate according to the present invention is represented by the term "exclusive molecular weight" which means the minimum molecular weight of polystyrene which could not enter into the pores of the microspherical particles of the cross-linked copolymer measured by the following GPC test.

A series of authentic specimens of polystyrene of the respectively known average molecular weights are subjected to GPC while using the microspherical particles of the cross-linked copolymer as a stationary phase, and the minimum molecular weight of the polystyrene which cannot enter into the fine particles of the cross-linked copolymer is determined. Namely, in the case where the minimum molecular weight of polystyrene which cannot enter into the pores of the microspherical particles of the cross-linked copolymer from the opening of the pores thereof is, for instance, 30,000, it is said in the present invention that the pore size of the porous substrate obtained by introducing methylol groups into the microspherical particles of the cross-linked copolymer corresponds to the exclusive molecular weight of polystyrene of 30,000, and hereinafter, a porous substrate having such a pore size according to the present invention is referred to as "the porous substrate having the exclusive molecular weight of 30,000".

According to the present invention, the porous substrate having the exclusive molecular weight of at least 30,000 is preferable, and that having the exclusive molecular weight of at least 50,000 is more preferable. In addition, the porous substrate having the pore size corresponding to the exclusive molecular weight of up to 5,000,000 may be prepared.

In the case where the porous microspherical particles of the cross-linked copolymer to the outer surface of which the water-soluble high polymeric substance adheres or is grafted is directly used for adsorbing protein thereon, although it is possible to disperse such particles in water, the hydrophilicity of the particle is still insufficient to allow the entrance and diffusion of a hydrophilic substance into and within the pores of the particle resulting in the problem of insufficient adsorbency for protein. In addition, because of the presence of the water-soluble high polymeric substance on the outer surface of the particles, for instance, in the case where the particles are packed in a column, the necessary pressure for flowing a fluid through the column at a high speed is higher than in the conventional case of packing other substrate owing to the viscous drag phenomena between the layer of the water-soluble high polymeric substance and the fluid.

Accordingly, it is difficult to flow the fluid at a high speed in the column packed with such particles and the reproducibility of elution of such a column is very poor.

According to the present invention, the above-mentioned problem has been solved by introducing methylol groups into the above-mentioned fine porous spherical particles of the cross-linked copolymer. As the method for introducing methylol groups into the cross-linked copolymer, a method has been publicly known wherein the compound is at first chloromethylated, and then the thus introduced chloromethyl groups are subjected to hydrolysis to be methylol groups. As the method of chloromethylation, for instance, a method wherein formaldehyde or a derivative thereof and hydrogen chloride are used in the presence of zinc chloride as a catalyst, a method wherein chloromethyl methyl ether is used in the presence of aluminum chloride or tin tetrachloride as a catalyst or the like may be mentioned.

The degree of chloromethylation is preferably such that not less than 0.2 group of chloromethyl group per one aromatic ring of the copolymer is introduced into the cross-linked copolymer from the viewpoint of offering an appropriate hydrophilicity to the resultant substrate having the methylol groups after hydrolysis. Namely, for instance, in the case of using chloromethyl methyl ether, the weight ratio of chloromethyl methyl ether to the cross-linked copolymer in chloromethylation is preferably 20:1 to 2:1, and more preferably 10:1 to 3:1 in consideration of the loss of the ether by evaporation during the reaction and the easiness of stirring in the reaction. Concerning the catalyst in chloromethylation, although $ZnCl_2$, $AlCl_3$ or $SnCl_4$ is generally used in an anhydrous state thereof, anhydrous tin tetrachloride is mainly used in the present invention in consideration of the catalytic activities and the easiness of after-treatment of the reaction products. The weight ratio of the ether and the catalyst is selected suitably in the range of from 100:30 to 100:0.5, and the chloromethylation is carried out at a temperature of 0° to 58° C. (chloromethyl methyl ether boils at 58° C.).

In the case where the cross-linked copolymer of the present invention is subjected to chloromethylation, the water-soluble high polymeric substance present on the outer surface of the microspherical porous particles of the cross-linked copolymer is also subjected to the chemical reaction and as a result, the surface of the particles colours heavier than in the case where the water-soluble high polymeric substance is absent on the outer surface of the particles, and is tinted in brown. Because of the partial release of the chemically reacted water-soluble high polymeric substance from the outer surface of the chloromethylated particles of the cross-linked copolymer, in the case of utilizing the particles as a substrate the problem of viscous drag phenomenon due to the water-soluble high polymeric substance on the outer surface of the particles of the cross-linked copolymer is almost solved.

The thus chloromethylated, cross-linked copolymer is subjected to hydrolysis in an alkaline medium at ordinary or a higher temperature, thereby chloromethyl groups are converted to methylol groups ($—CH_2OH$). Since the reaction rate is small in an aqueous sodium hydroxide solution, methanol is preferably added to the system for accelerating the reaction. The concentration of the alkali and the amount of methanol in the reaction system, the temperature and time of reaction may be selected according to the desired degree of introduction of methylol groups. It is preferable to carry out the hydrolysis to the extent of 50% or more of the theoretical. Accordingly, the number of methylol groups introduced into the cross-linked copolymer is preferably 0.1 or more per one aromatic ring of the thus produced porous substrate.

The porous substrate obtained by the above-mentioned process according to the present invention is more hydrophilic than the cross-linked copolymer due to the presence of the methylol groups, and accordingly extremely well dispersed in an aqueous medium. More-over, even the surface of the pores thereof is provided with hydrophilicity and so proteins and in addition, hydrophilic substances of low molecular weight can enter into the pores freely. Furthermore, since the surface of the pores is merely hydroxymethylated without adhesion of the water-soluble high polymeric substance, the hydrophilicity of the surface of the pores is less than that of the outer surface of the porous substrate due to the partially retained hydrophobic region. Accordingly, the protein molecule once entered into the pore is almost completely adsorbed hydrophobically in the pore. In addition, as has been mentioned, the excessive water-soluble high polymeric substance once adhered onto the outer surface of the particles of the cross-linked copolymer is released accompanying with chloromethylation. Therefore, even in the case where the substrate is packed in a column for the purpose of chromatography, a high fluid flow can be obtained without any problem of viscous drag problem and with a reproducible result of chromatography. Such a column can separate hydrophilic high polymer of a relatively low molecular weight. The porous substrate according to the present invention has been provided with the above-mentioned merits.

The porous substrate according to the present invention may be used not only for adsorbing protein but also in various fields, for instance, as a substrate for separating hydrophilic substances of low molecular weight, in precolumn-removing of protein and in a field for an antigen-antibody reaction, or the like.

The present invention will be explained more in detail while referring to the following non-limiting examples:

EXAMPLE 1

Two grams of methyl cellulose was dissolved in 125 g of water, and 0.025 g of sodium lauryl sulfate was added. After the mixture was charged into an ampoule of 300 ml, into the ampoule were added 3.27 g of styrene, 2.73 g of divinylbenzene and 6.75 g of toluene and 2.25 g of n-dodecane as pore regulators, the mixture was then stirred at 60° C. for 17 hours to react while using benzoyl peroxide as an initiator. The resultant beads were washed with water and acetone and then dried at room temperature under reduced pressure. The diameter of the spherical particles (beads) was substantially uniform and about 20μ.

The exclusive molecular weight of the bead was about 100,000, this value being measured by eluting polystyrene having various predetermined molecular weights on a column packed with the beads.

In a reaction vessel 5 g of the beads was placed followed by adding 35 ml of chloromethyl methyl ether and 1.5 ml of anhydrous tin tetrachloride. The mixture was then refluxed at 50° to 60° C. for 6 hours to chloromethylate the beads. The beads colored progressively to dark brown with the reaction. The beads were washed after reaction with methanol containing hydrochloric acid repeatedly and finally with acetone. The color of the beads was finally yellow brown. The new absorption peaks appeared at 1260 and 670 cm$^{-1}$ in the infrared absorption spectrum of the beads after chloromethylation. The degree of chloromethylation was about 0.5 chloromethyl groups per one aromatic moiety.

The chloromethylated beads were added into a solution of 25 g of sodium hydroxide in 100 g of methanol, and the solution was maintained at 60° C. for 15 hours to react. The new I.R. absorption peak appeared at 1090 cm$^{-1}$ due to the introduction of —CH$_2$OH groups. The number of methylol groups was 0.3 per one aromatic moiety.

The obtained beads were dispersed very well in water, various buffer solutions, urine or the like without aggregation.

The beads were packed into a stainless steel column of 4 mm in diameter and 500 mm in length for a high-speed liquid chromatography. A solution of bovine serum albumin in 1/20 M phosphoric buffer was subjected to the high-speed liquid chromatography using the phosphoric buffer as an eluent at a flow rate of 1 ml/min. No albumin was eluted. Further, no albumin was eluted even after passing of 50 μl of 10% bovine serum albumin 50 times repeatedly.

Twenty μl of a sample of a solution of uric acid, creatinine, p-aminobenzoic acid and albumin in 1/20 M phosphoric buffer was passed through the column. Uric acid, creatinine and p-aminobenzoic acid were completely separated from one another while no albumin was eluted. Refer to Figure attached herewith which shows a chart recording elution peaks at a chart speed of 1 cm/3 min and measured by wave length of 250 nm. The pressure was 25 kg/cm$^2$ at the flow rate of 1 ml/min.

COMPARATIVE EXAMPLE 1

For comparison, beads having the exclusive molecular weight of about 7000 were prepared in the same manner as Example 1 by using 9 g of toluene as a pore regulator instead of the pore regulators of Example 1.

In a column packed with these beads, albumin was eluted even when only 50 μl of 10% bovine serum albumin solution was passed.

COMPARATIVE EXAMPLE 2

A styrene-divinylbenzene copolymer was prepared in the same manner as Example 1 while using 13.9 g of calcium phosphate and 4.07 mg of sodium n-dodecylbenzenesulfonate instead of methyl cellulose and sodium lauryl sulfate of Example 1. After washing with water the copolymer was sieved to obtain beads having diameter of 10 to 20μ. However, the distribution of the bead diameter is broad. The exclusive molecular weight was about 100,000.

The obtained beads were washed thoroughly with hydrochloric acid to remove calcium phosphate. The beads were not dispersed in water at all and were agglutinated.

After drying the beads, chloromethylation was carried out as in Example 1. The beads colored only slightly to light yellow finally. Chloromethyl groups were then converted to methylol groups as in Example 1. The obtained beads were less hydrophilic than those of Example 1 and the dispersion into water or urine was not good. In a column packed with the beads, albumin was not completely adsorbed and a very broad peak of albumin was obtained. The reason is considered that the beads is less hydrophilic than those of Example 1 and protein can not enter into the pores.

EXAMPLE 2

Porous minute beads of styrene-divinylbenzene copolymer having the exclusive molecular weight of 300,000 were prepared in the same manner as in Example 1 while using 4.5 g of toluene and 4.5 g of n-dodecane as pore regulators. The beads were treated in the same manner as in Example 1 to obtain substrate having methylol groups. The obtained substrate was dispersed well in serum and urine. In the column packed with the substrate, albumin was not eluted even after passing 50 μl of 10% bovine serum albumin solution through the column 50 times repeatedly.

What is claimed is:

1. A porous substrate capable of absorbing protein, having an exclusive molecular weight of at least 30,000 having a hydrophilic outer surface and a hydrophobic pore surface which substrate comprises a cross-linked copolymer having methylol groups, produced by subjecting a monomeric mixture of at least one monomer selected from styrene, alpha-methylstyrene and chloromethylstyrenes and a cross-linking agent copolymerizable with the monomer to suspension copolymerization in an aqueous solution of 5 to 60 parts by weight of the water-soluble high polymeric substance per 100 parts by weight of the monomeric mixture of the monomer and the cross-linking agent in the presence of a pore-regulator, and introducing methylol groups into the resultant cross-linked copolymer.

2. The substrate of claim 1, in which the cross-linking agent is selected from the group consisting of divinylbenzene, trivinylbenzene, triallyl isocyanurate, dimethacrylates and diacrylates of polyhydric alcohols and diallyl phthalate.

3. The substrate of claim 1, in which the cross-linked copolymer is a styrene-divinylbenzene copolymer.

4. The substrate of claim 1, which is a spherical particle having a diameter in the range of 1 to 300μ.

5. The substrate of claim 1, which has an exclusive molecular weight of at least 50,000.

6. The substrate of claim 1, which has at least 0.1 methylol group per one aromatic moiety.

7. A process for preparing a porous substrate capable of adsorbing protein, comprising
    (1) subjecting a mixture of a monomer of styrenes and a cross-linking agent copolymerizable with the monomer to suspension polymerization in an aqueous solution of 5 to 60 parts by weight of the water-soluble high polymeric substance per 100 parts by weight of the monomeric mixture of the monomer and the cross-linking agent in the presence of a pore regulator, said pore regulator providing the porous substrate with an exclusive molecular weight of at least 30,000, and
    (2) introducing methylol groups into the resultant cross-linked polymer.

8. The process of claim 7, wherein the monomer of styrenes is selected from the group consisting of styrene, α-methylstyrene, chloromethylstyrene and a mixture thereof.

9. The process of claim 7 wherein the cross-linking agent is selected from the group consisting of divinylbenzene, trivinylbenzene, triallyl isocyanurate, dimethacrylates and diacrylates of polyhydric alcohols and diallyl phthalate.

10. The process of claim 7, wherein the monomer is styrene and the cross-linking agent is divinylbenzene.

11. The process of claim 7, wherein the amount of the cross-linking agent is in the range of 30 to 70% by weight to the total amount of the mixture of the monomer and the cross-linking agent.

12. The process of claim 7, wherein the water-soluble high polymeric substance is selected from the group consisting of polyethylene oxide, saponified polyvinyl acetates, polyvinyl alcohol, polyvinyl pyrrolidone and methyl cellulose.

13. The process of claim 7, wherein the amount of the water-soluble high polymeric substance is in the range of 10 to 40 parts by weight per 100 parts by weight of the mixture of the monomer and the cross-linking agent.

14. The process of claim 7, wherein the pore regulator is organic solvent soluble in the monomer.

15. The process of claim 14, wherein the pore regulator is selected from the group consisting of an aromatic hydrocarbon, a chlorohydrocarbon, an aliphatic hydrocarbon and a mixture thereof.

16. The process of claim 15, wherein the aromatic hydrocarbon is benzene, tolouene, or xylene, the chlorohydrocarbon is trichloroethylene, chloroform, or carbon tetrachloride, and the aliphatic hydrocarbon is n-hexane, n-heptane, n-octane, or n-dodecane.

17. The process of claim 7, wherein the amount of the pore regulator is in the range of 20 to 300 parts by weight of 100 parts by weight of the mixture of the monomer and the cross-linking agent.

18. The process of claim 7, wherein the resultant cross-linked copolymer is provided with methylol groups by chloromethylating the copolymer followed by hydrolysis.

* * * * *